United States Patent
Tezuka et al.

(10) Patent No.: US 9,409,272 B2
(45) Date of Patent: Aug. 9, 2016

(54) TOOL PATH DISPLAY APPARATUS FOR MACHINE TOOL

(75) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 940 days.

(21) Appl. No.: 13/442,012

(22) Filed: Apr. 9, 2012

(65) Prior Publication Data
US 2012/0257276 A1 Oct. 11, 2012

(30) Foreign Application Priority Data
Apr. 11, 2011 (JP) .................... 2011-087646

(51) Int. Cl.
*B23Q 17/24* (2006.01)
*G05B 19/4068* (2006.01)
*H04N 13/02* (2006.01)
*H04N 13/04* (2006.01)

(52) U.S. Cl.
CPC ........ *B23Q 17/2409* (2013.01); *G05B 19/4068* (2013.01); *G05B 2219/35318* (2013.01); *G05B 2219/35322* (2013.01); *G05B 2219/35349* (2013.01); *H04N 13/0203* (2013.01); *H04N 13/04* (2013.01)

(58) Field of Classification Search
None
See application file for complete search history.

(56) References Cited

U.S. PATENT DOCUMENTS

| 8,018,192 | B2 | 9/2011 | Iwashita et al. | |
|---|---|---|---|---|
| 2007/0242073 | A1 | 10/2007 | Nagatsuka et al. | |
| 2010/0331950 | A1* | 12/2010 | Strommer | A61B 5/0066 623/1.11 |
| 2011/0015877 | A1 | 1/2011 | Okita et al. | |
| 2011/0043613 | A1* | 2/2011 | Rohaly | G06T 17/00 348/50 |

FOREIGN PATENT DOCUMENTS

| CN | 101058183 A | 10/2007 |
|---|---|---|
| CN | 101957610 A | 1/2011 |

(Continued)

OTHER PUBLICATIONS

Terry Peters et al., "Three-Dimensional Multimodal Image-Guidance for Neurosurgery", Apr. 1996, IEEE Transactions on Medical Imaging, vol. 15, No. 2, p. 121-128.*

(Continued)

*Primary Examiner* — Mohammad Ali
*Assistant Examiner* — Saad M Kabir
(74) *Attorney, Agent, or Firm* — Hauptman Ham, LLP

(57) ABSTRACT

A tool path display apparatus, configured to display a three-dimensional path of a movable part of a machine tool, calculates three-dimensional coordinate values of the movable part as viewed from a coordinate system secured to a workpiece, thereby determining the three-dimensional path of the movable part. Left- and right-eye stereoscopic image data are determined based on the determined three-dimensional path of the movable part, and the determined left- and right-eye stereoscopic image data are displayed on the display apparatus so that they can be viewed by an operator's left and right eyes, respectively.

7 Claims, 12 Drawing Sheets

(56) References Cited

FOREIGN PATENT DOCUMENTS

| | | | |
|---|---|---|---|
| CN | 101995848 | A | 3/2011 |
| DE | 102007055252 | A1 | 5/2009 |
| DE | 102010017763 | A1 | 2/2011 |
| JP | 1116521 | A | 5/1989 |
| JP | 7181429 | A | 7/1995 |
| JP | 2001216015 | A | 8/2001 |
| JP | 2011043874 | A | 3/2011 |
| JP | 2011060016 | A | 3/2011 |

OTHER PUBLICATIONS

JP Office Action, dated Aug. 7, 2012, issued in JP Application No. 2011-087646.
Office Action dated Jan. 14, 2014, corresponds to German patent application No. 102012103075.8.
Office Action mailed Jan. 13, 2014, corresponds to Chinese patent application No. 201210104179.6.

* cited by examiner

FIG. 14
(a)
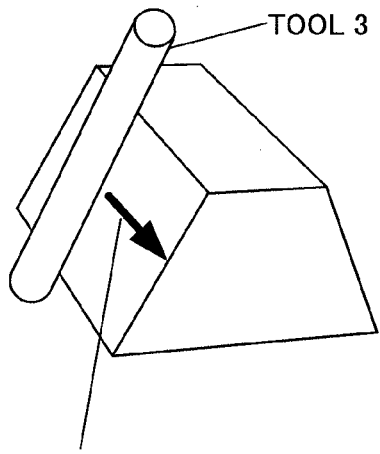
MOVEMENT DIRECTION OF TOOL
(b)
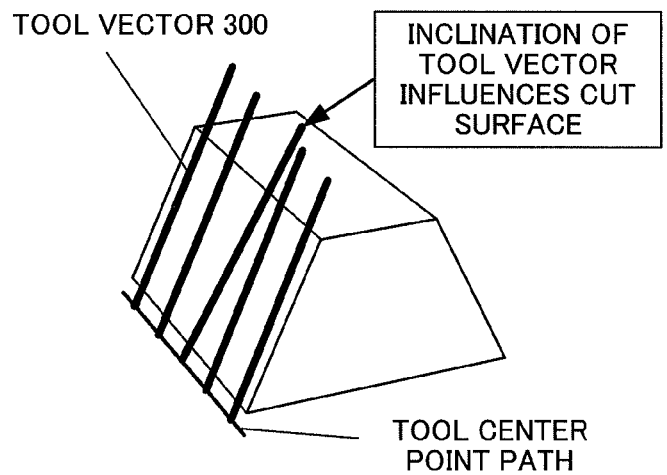
TOOL VECTOR 300
INCLINATION OF TOOL VECTOR INFLUENCES CUT SURFACE
TOOL CENTER POINT PATH
FIG. 16
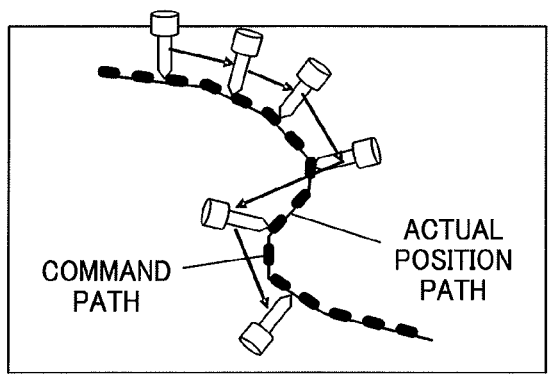
COMMAND PATH
ACTUAL POSITION PATH

TOOL PATH DISPLAY APPARATUS FOR MACHINE TOOL

RELATED APPLICATIONS

The present application is based on, and claims priority from, Japanese Application Number 2011-087646, filed Apr. 11, 2011, the disclosure of which is hereby incorporated by reference herein in its entirety.

BACKGROUND OF THE INVENTION

1. Field of the Invention

The present invention relates to a display apparatus having a function to display a three-dimensional path of a movable part of a machine tool by the application of the stereoscopic technologies based on the parallax of the eyes.

2. Description of the Related Art

In a machine tool, the position of a tool center point is controlled by means of a plurality of drive axes that are controlled by a numerical controller. A three-dimensional path of the tool center point can be displayed as a two-dimensional image on the screen of a display apparatus by being projected on a certain flat surface. Japanese Patent Application Laid-Open No. 2011-43874 discloses a display apparatus that can visually grasp the correspondence between a position on the three-dimensional path of the tool center point and a position on a time axis of waveform data for each axis.

There are technologies in which a stereoscopic image is stereoscopically displayed on a display apparatus. For example, Japanese Patent Application Laid-Open No. 7-181429 discloses a stereoscopic display apparatus using a slit light source to achieve stereoscopic vision. Further, Japanese Patent Application Laid-Open No. 1-116521 discloses a technique in which stereoscopic vision is achieved by dividing a visible region into frequency bands for the left and right eyes.

SUMMARY OF THE INVENTION

In displaying a three-dimensional path of a tool center point, as a two-dimensional image projected on a certain flat surface, on a screen, it is necessary to convert the three-dimensional path to two-dimensional data. The two-dimensional data does not include depth data on the three-dimensional path of the tool center point. It is difficult, therefore, to accurately determine the orientation of the three-dimensional path of the tool center point with respect to the plane of the display screen.

Accordingly, the object of the present invention is to provide a tool path display apparatus for a machine tool, capable of achieving intuitive recognition of a three-dimensional shape of a path of a movable part, which has been difficult to achieve by conventional planar display, by the application of the stereoscopic technologies based on the parallax of the eyes.

A tool path display apparatus for a machine tool according to the present invention displays a three-dimensional path of a movable part of the machine tool configured to control positions and attitudes of a tool and a workpiece by means of a plurality of drive axes using a numerical controller. This tool path display apparatus comprises a data acquisition unit configured to simultaneously acquire and store, as time-series data, actual position data for the plurality of drive axes at each time, a movable part path calculation unit configured to calculate three-dimensional coordinate values of the movable part as viewed from a coordinate system secured to the workpiece, based on the actual position data stored in the data acquisition unit and data on the mechanical structure of the machine tool, thereby determining the three-dimensional path of the movable part, a stereoscopic image generation unit configured to determine left- and right-eye stereoscopic image data based on the three-dimensional path of the movable part determined by the movable part path calculation unit, and a stereoscopic image display unit configured to display the left- and right-eye stereoscopic image data determined by the stereoscopic image generation unit so that the image data are visible from the left and right eyes corresponding thereto.

The plurality of drive axes may include at least one rotary axis, the movable part path calculation unit may determine a three-dimensional path of a tool center point of the tool, and the stereoscopic image generation unit may determine left- and right-eye stereoscopic image data based on the three-dimensional path of the tool center point. Further, The tool path display apparatus may further comprise a stereoscopic image generation unit configured to calculate three-dimensional coordinates of a tool vector start point as viewed from the coordinate system secured to the workpiece, based on the actual position data for the plurality of drive axes at each time and the data on the mechanical structure of the machine tool, the tool vector start point being located at a predetermined distance from the tool center point toward the base of the tool, on a central axis of the tool, and to determine left- and right-eye stereoscopic image data based on a tool vector, which connects the tool vector start point and the tool center point, and three-dimensional path data on the tool center point.

The tool path display apparatus may further comprise a command position data acquisition unit configured to simultaneously acquire, as time-series data, command position data for the plurality of drive axes at each time, a movable part command path calculation unit configured to calculate command coordinate values of the movable part or the tool center point as viewed from the coordinate system secured to the workpiece, based on the command position data for the plurality of drive axes at each time and the data on the mechanical structure of the machine tool, thereby determining a command path of the movable part or the tool center point, a path error calculation unit configured to determine an error between the command path and an actual position path of the movable part or the tool center point, an error-magnified three-dimensional path generation unit configured to magnify the error determined by the path error calculation unit at a predetermined magnification ratio relative to the command path, thereby generating three-dimensional path data with the error highlighted, and a stereoscopic image generation unit configured to determine left- and right-eye stereoscopic image data based on the three-dimensional path data with the highlighted error determined by the error-magnified three-dimensional path generation unit.

In the tool path display apparatus according to the present invention, a point corresponding to a certain time may be displayed highlighted on the stereoscopic image data generated by the stereoscopic image generation unit, the highlighted point being displayed moving on a path as the tool moves with time.

According to the present invention, there may be provided a tool path display apparatus for a machine tool, capable of achieving intuitive recognition of a three-dimensional shape of a path of a movable part, which has been difficult to achieve by conventional planar display, by the application of the stereoscopic technologies based on the parallax of the eyes.

BRIEF DESCRIPTION OF THE DRAWINGS

The above and other objects and features of the present invention will be obvious from the ensuing description of embodiments with reference to the accompanying drawings, in which:

FIG. 14 is a diagram illustrating a tool vector.

FIG. 16 is a diagram illustrating marker display; and

DETAILED DESCRIPTION OF THE PREFERRED EMBODIMENTS

Figure 1:
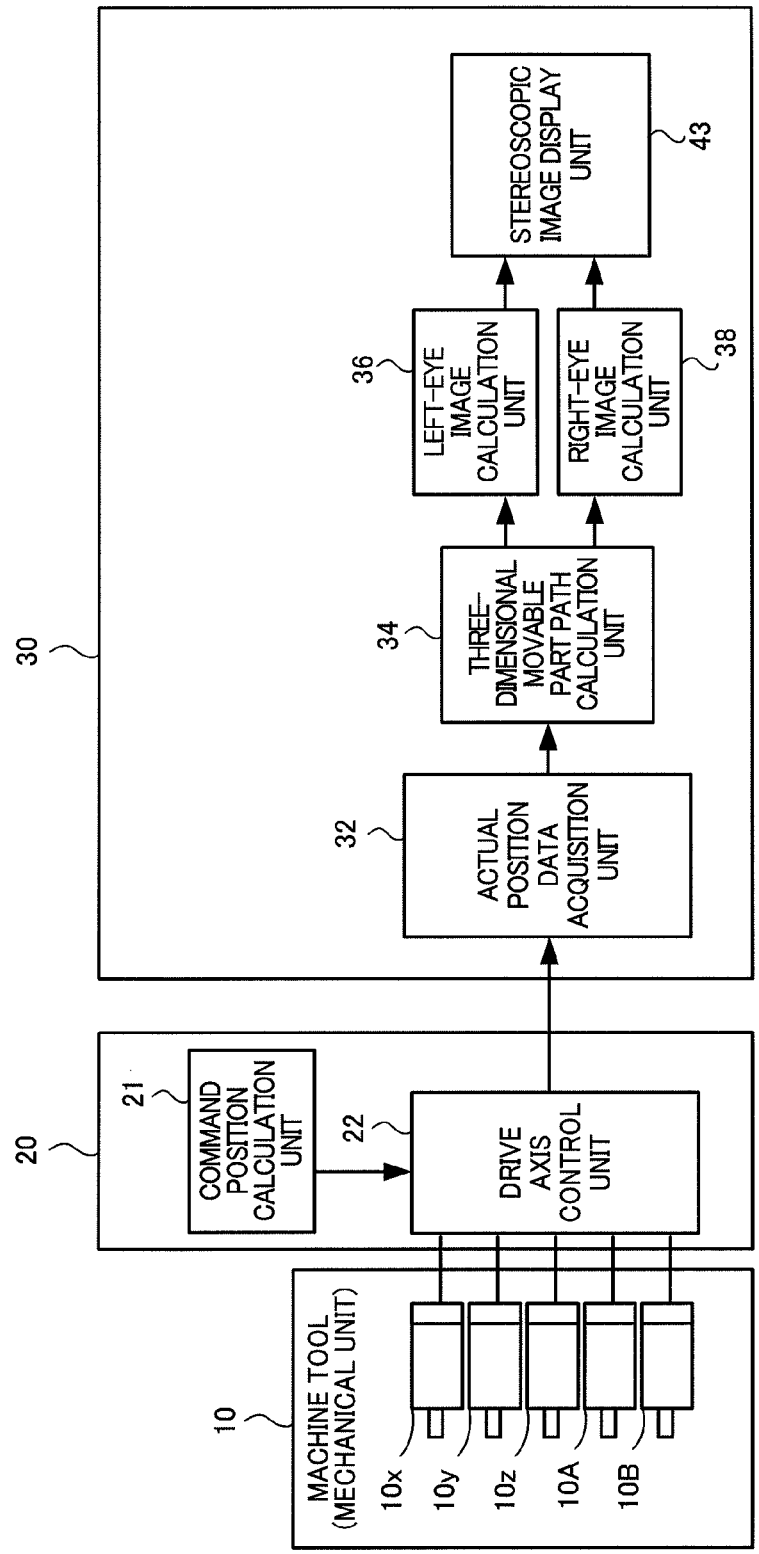
FIG. 1 is a diagram schematically illustrating a configuration of a system comprising a tool path display apparatus according to Embodiment 1 of the present invention.

FIG. 1 is a diagram schematically illustrating a configuration of a system comprising a tool path display apparatus according to Embodiment 1 of the present invention. In this embodiment, a three-dimensional path of an actual position of a movable part of a machine tool is displayed.

A machine tool 10 is a five-axis machine having three linear axes, x-, y-, and z-axes, and two rotary axes, A- and B-axes, and its mechanical unit comprises an x-axis motor 10x, y-axis motor 10y, z-axis motor 10z, A-axis motor 10A, and B-axis motor 10B. The motors 10x, 10y, 10z, 10A and 10B for the x-, y-, z-, A-, and B-axes of the machine tool 10 are controlled by a numerical controller 20.

The numerical controller 20 comprises a command position calculation unit 21 and a drive axis control unit 22. The command position calculation unit 21 determines command positions in which the axes of the machine tool 10 are to be located, individually, at each time. The drive axis control unit 22 controls the operations of the motors 10x, 10y, 10z, 10A and 10B for the axes, based on the command positions determined by the command position calculation unit 21. The motor for each axis is provided with a position detecting device (not shown). Actual position data for each axis detected by the position detecting device is fed back to the numerical controller 20.

A tool path display apparatus 30 comprises an actual position data acquisition unit 32, three-dimensional movable part path calculation unit 34, left-eye image calculation unit 36, right-eye image calculation unit 38, and stereoscopic image display unit 43. The actual position data acquisition unit 32 acquires actual position data, which is data on the actual position of each axis at a discrete time, also as time-series data from the drive axis control unit 22 of the numerical controller 20. The left-eye image calculation unit 36 calculates left-eye stereoscopic image data based on a three-dimensional path of the movable part determined by the three-dimensional movable part path calculation unit 34. The right-eye image calculation unit 38 calculates right-eye stereoscopic image data. The stereoscopic image display unit 43 displays images based on the calculated left- and right-eye image data from the image calculation units 36 and 38 so that the images can be viewed individually by the left and right eyes of a viewer.

The three-dimensional movable part path calculation unit 34 determines the three-dimensional path of the movable part by calculating the three-dimensional coordinate values of the movable part, as viewed from a coordinate system secured to a workpiece to be machined by the machine tool 10, based on data on the actual positions of the respective axes and data on the mechanical structure of the machine tool 10. Discrete data acquired by the actual position data acquisition unit 32 is saved as required in a memory (not shown). The same applies to the following other embodiments.

Figure 2:
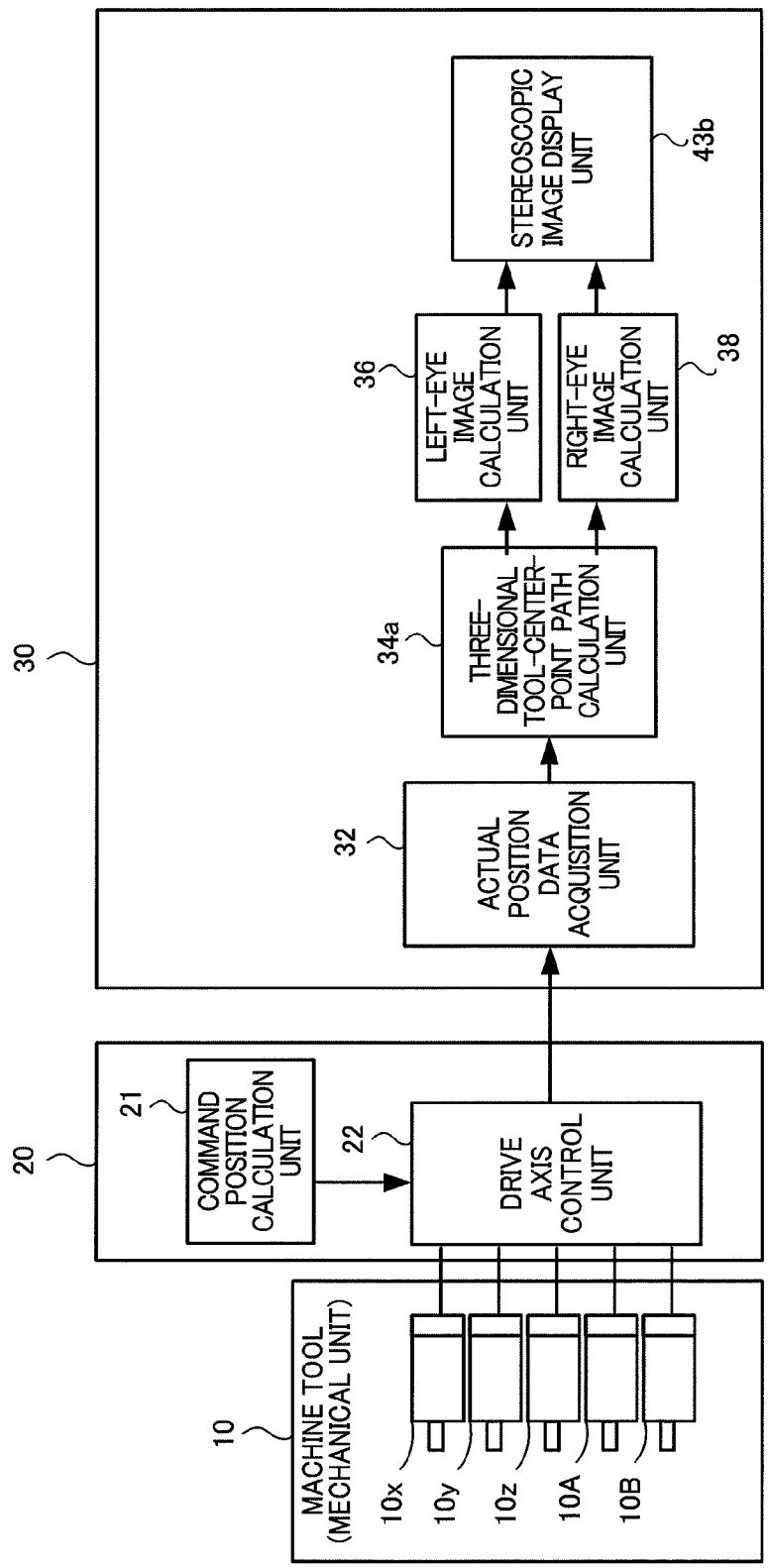
FIG. 2 is a diagram schematically illustrating a configuration of a system comprising a tool path display apparatus according to Embodiment 2 of the present invention.

FIG. 2 is a diagram schematically illustrating a configuration of a system comprising a tool path display apparatus according to Embodiment 2 of the present invention. In this embodiment, a three-dimensional path of a tool center point is displayed as an example of a representative point of a movable part of a machine tool. Normally, the tool center point is located at the distal end of a tool.

A three-dimensional tool-center-point path calculation unit 34a determines the three-dimensional path of the tool center point, as viewed from the coordinate system secured to the workpiece to be machined by the machine tool 10, based on the data on the actual positions of the respective axes and the data on the mechanical structure of the machine tool 10, simultaneously received as time-series data from the actual position data acquisition unit 32. Then, left- and right-eye stereoscopic image data are calculated by the left- and right-eye image calculation units 36 and 38, images based on the calculated image data are displayed on a stereoscopic image display unit 43b so that they can be viewed individually by the corresponding eyes, and the three-dimensional path of the tool center point is displayed stereoscopically.

Figure 3:
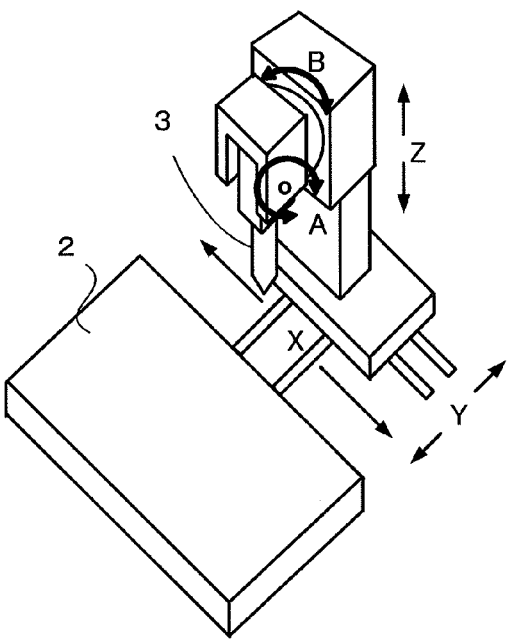
FIG. 3 is an exterior perspective view showing one example of a five-axis machine with a rotary tool head.

The following is a description of a method for determining the coordinates of the tool center point of a tool 3 of a five-axis machine as an example. FIG. 3 is an exterior perspective view showing the five-axis machine with a rotary tool head.

The five-axis machine shown in FIG. 3 has three linear axes, X-, Y-, and Z-axes, and two rotary axes, A- and B-axes. The coordinates of these five axes at a time t are assumed to be x(t), y(t), z(t), a(t) and b(t), respectively. A workpiece (not shown) to be machined is mounted on a table 2. The tool center point of the tool 3 moves relative to the workpiece, along or around the linear axes (X-, Y-, and Z-axes) and the rotary axes (A- and B-axes).

The point of intersection of the two rotary axes (A- and B-axes) of the five-axis machine with a rotary tool head is assumed to be M. If a coordinate system with an appropriate origin is then imagined such that it is secured to the workpiece, the coordinates of the point M can be given as (x(t), y(t), z(t)). If the length from the point M to the tool center point is L and if the position where the tool 3 faces just downward is assumed to be a reference position (origin) for the A- and B-axes, coordinates (PosX(t), PosY(t), PosZ(t)) of a tool center point Pe are calculated according to $$PosX = x(t) + L \times \cos(a(t)) \times \sin(b(t)),$$

$$PosY = y(t) + L \times \sin(a(t)), \text{ and}$$

$$PosZ = z(t) - L \times \cos(a(t)) \times \cos(b(t)). \tag{1}$$

Thus, the coordinates of the tool center point of the tool 3 can be calculated based on position data for the five axes and conditions of the mechanical structure of the machine tool.

Figure 4:
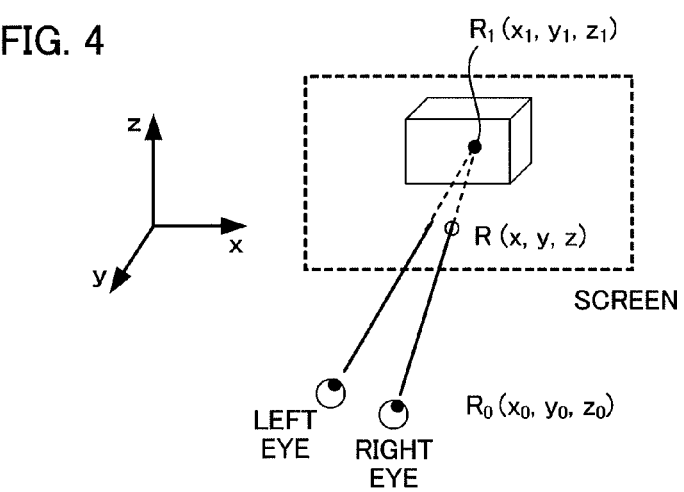
FIG. 4 is a diagram illustrating a method for creating a stereoscopic image.

A method for creating a stereoscopic image will now be described with reference to FIG. 4.

Left- and right-eye images are created based on a three-dimensional path determined by the coordinates of the tool center point. A cube shown in FIG. 4 is used to explain an example of a method for creating the right-eye image. If a point $R_1$ on the cube is viewed by the right eye through a screen, the position of the right eye is assumed to be $R_0$. A point of intersection of the screen and a straight line that connects the points $R_0$ and $R_1$ is assumed to be R. Thereupon, the point R on the screen is a projection of the point $R_1$ on the cube. Thus, the cube can be projected on the screen by determining the point of intersection R with the screen while moving the point $R_1$ on the cube. The resulting projected image is regarded as the right-eye image. The position of the point of intersection R is calculated according to $$\vec{r} = \vec{r}_0 + \frac{\vec{n}(\vec{r}_2 - \vec{r}_0)}{\vec{n}(\vec{r}_1 - \vec{r}_0)}(\vec{r}_1 - \vec{r}_0) \tag{2}$$

$\vec{r}$: position vector of the point of intersection $R$;

$\vec{r}_0$: position vector of $R_0$ $\vec{r}_1$: position vector of $R_1$ $\vec{n}$: normal vector of the screen $\vec{r}_2$: position vector of a reference point $R_2$ on the screen The left-eye image can be created in the same manner as the right-eye image.

Figure 5:
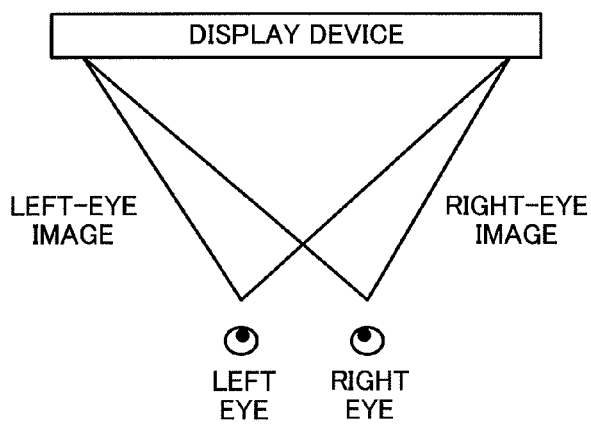
FIG. 5 is a diagram illustrating how stereoscopic vision can be achieved by displaying left- and right-eye images on a stereoscopic display device.

The created left- and right-eye images can be stereoscopically viewed by being displayed on a stereoscopic display device, such as the one shown in FIG. 5.

Figure 6:
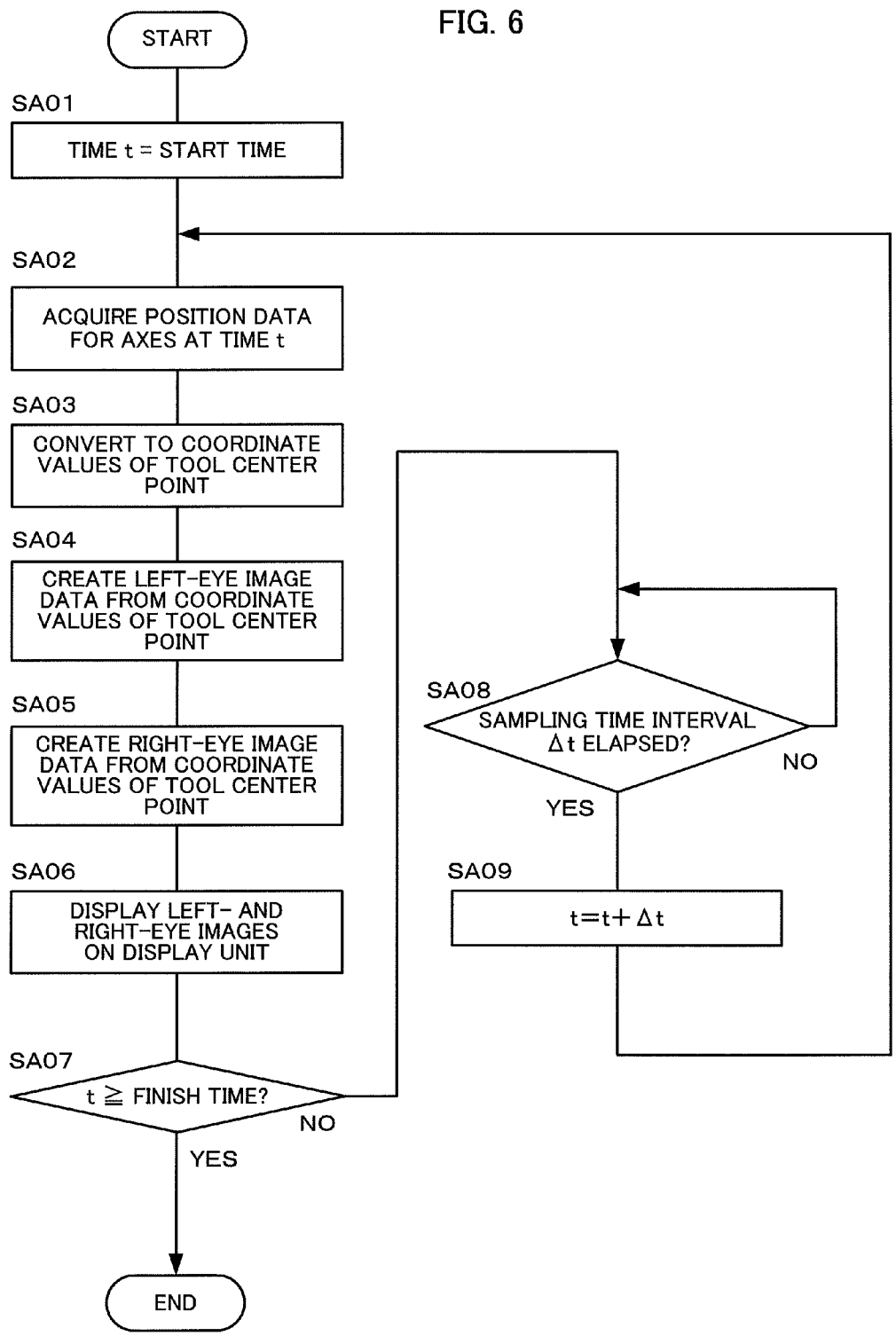
FIG. 6 is a flowchart showing an example of processing for stereoscopically displaying an actual position path of a tool center point.

FIG. 6 is a flowchart illustrating processing for stereoscopically displaying an actual position path of the tool center point. The following is a sequential description of processing to be carried out at respective steps.

[Step SA01] A start time is input to TIME t.

[Step SA02] Position data for the individual axes at TIME t are acquired.

[Step SA03] The acquired position data for the individual axes are converted to coordinate values of the tool center point. Specifically, the three-dimensional coordinate values of the tool center point, as viewed from the coordinate system secured to the workpiece, are calculated based on the position data for the individual axes acquired in Step SA02 and the data on the mechanical structure of the machine tool.

[Step SA04] The left-eye image data is created based on the coordinate values of the tool center point.

[Step SA05] The right-eye image data is created based on the coordinate values of the tool center point.

[Step SA06] The left- and right-eye images are displayed on the display unit.

[Step SA07] It is determined whether or not the time t has passed a finish time. If it is determined that the finish time is not passed, the program proceeds to Step SA08. If the finish time is determined to have been passed, this processing is terminated.

[Step SA08] It continues to be determined whether or not a sampling time interval At has elapsed. If the time interval At is determined to have elapsed, the program proceeds to Step SA09.

[Step SA09] TIME t is updated by adding the sampling time interval Δt to the current TIME t, whereupon the program proceeds to Step SA02 and this processing is continued.

As described above in connection with Embodiments 1 and 2 of the present invention, the actual position path of the representative point of the movable part, e.g., the tool center point of the machine tool, includes a three-dimensional curve. An error occurs between this actual position path and a path commanded by the numerical controller 20. The following is a description of Embodiment 3 of the tool path display apparatus for a machine tool capable of intuitively recognizing the error of the three-dimensional curve, that is, a deviation (hereinafter referred to as "three-dimensional path error") of an actual path from the commanded path.

Figure 7:
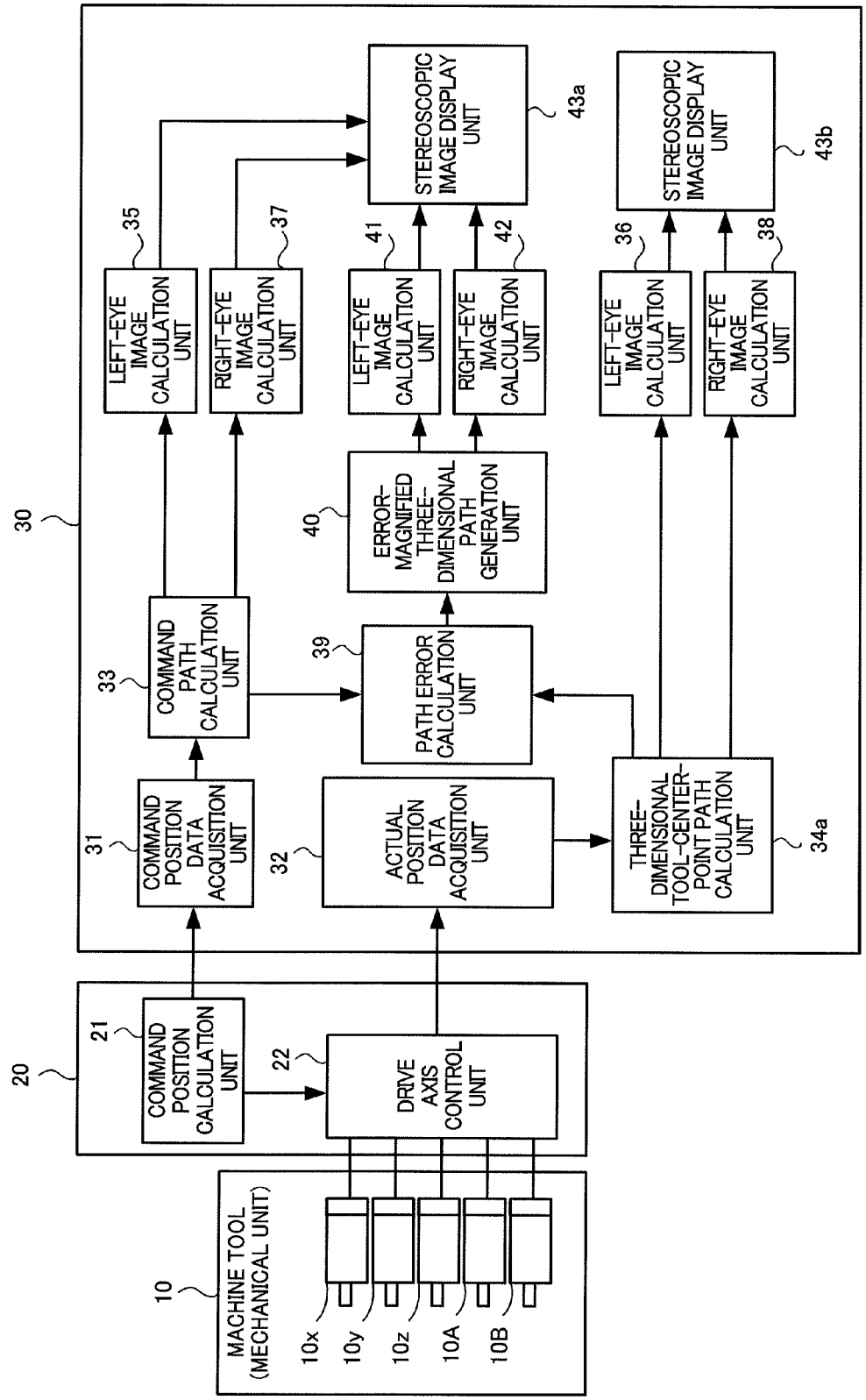
FIG. 7 is a diagram schematically illustrating a configuration of a system comprising a tool path display apparatus according to Embodiment 3 of the present invention.

FIG. 7 is a diagram schematically illustrating a configuration of a system comprising the tool path display apparatus according to Embodiment 3 of the present invention. In connection with this embodiment, a tool center point will be described as an example of the representative point of the movable part of the machine tool.

A tool path display apparatus 30 according to Embodiment 3 comprises a command position data acquisition unit 31, command path calculation unit 33, command-path left-eye image calculation unit 35, and command-path right-eye image calculation unit 37, in addition to the actual position data acquisition unit 32, three-dimensional tool-center-point path calculation unit 34a, left-eye image calculation unit 36, right-eye image calculation unit 38, and stereoscopic image display unit 43b of the tool path display apparatus 30 according to Embodiment 2 shown in FIG. 2. The command position data acquisition unit 31 simultaneously acquires command position data at discrete times from the command position calculation unit 21 of the numerical controller 20. The data acquired by the command position data acquisition unit 31 are saved in a memory (not shown), if necessary.

Based on data on the command positions of the respective axes and data on the mechanical structure of a machine tool 10, the command path calculation unit 33 calculates the command position coordinate values of a tool center point, as viewed from a coordinate system secured to a workpiece to be machined by the machine tool 10, thereby determining a command path of the tool center point. Then, based on the command path of the tool center point determined by the command path calculation unit 33, left- and right-eye stereoscopic image data are calculated by the left- and right-eye image calculation units 35 and 37, respectively. Images based on the calculated image data are displayed on a stereoscopic image display unit 43a so that they can be viewed individually by the corresponding eyes, and the command path is displayed stereoscopically.

In order to achieve intuitive recognition of the three-dimensional path error, according to Embodiment 3, moreover, the path error of the actual position path of the tool center point with respect to the command path calculated by the command path calculation unit 33 is calculated by a path error calculation unit 39. Then, in an error-magnified three-dimensional path generation unit 40, the path error calculated by the path error calculation unit 39 is magnified at a predetermined magnification ratio, and three-dimensional path data with the path error highlighted by the magnification is generated. Then, left- and right-eye stereoscopic image data corresponding to the individual eyes are calculated by left- and right-eye image calculation units 41 and 42, respectively. Images based on the calculated image data are displayed on the stereoscopic image display unit 43a so that they can be viewed individually by the corresponding eyes, and a three-dimensional path with the highlighted error is displayed stereoscopically. Embodiment 3 may be configured so that only the three-dimensional path with the highlighted error is displayed stereoscopically.

Figure 8:
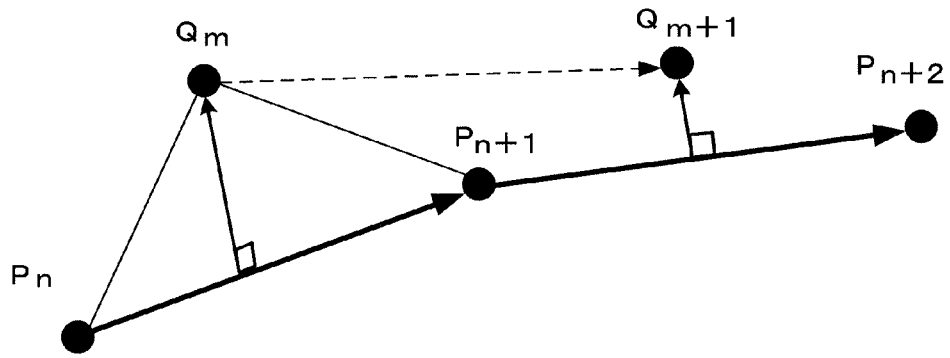
FIG. 8 is a diagram illustrating a three-dimensional path error.

FIG. 8 is a diagram illustrating the three-dimensional path error.

Figure 9:
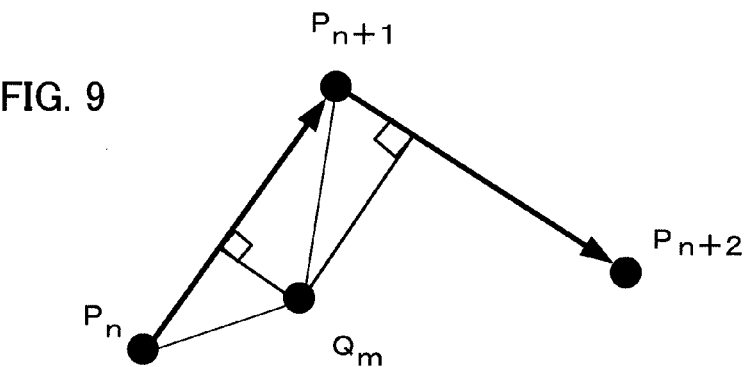
FIG. 9 is a diagram illustrating how an error vector is selected from a plurality of perpendicular lines, if any, drawn from an actual position or point $Q_m$ to line segments that constitute a command path.
Figure 10:
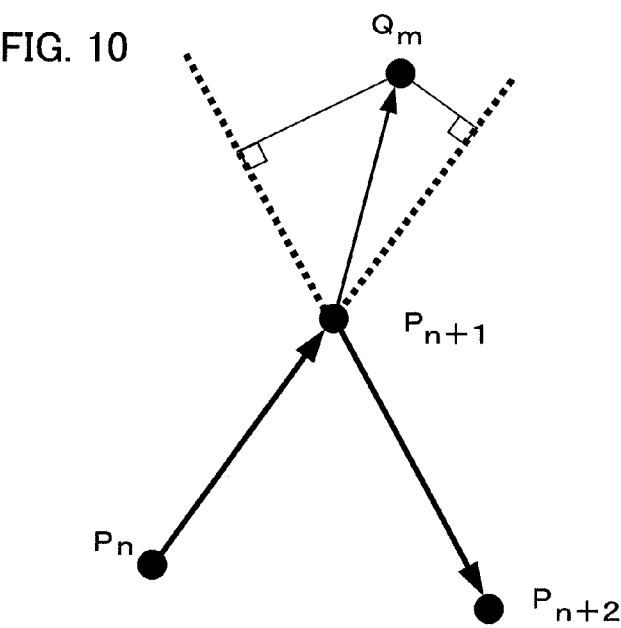
FIG. 10 is a diagram illustrating how an error vector is determined if there is no perpendicular line that can be drawn from the actual position or point $Q_m$ to the line segments that constitute the command path.

In FIG. 8, an nth command position and an mth actual position are designated by $P_n$ and $Q_m$, respectively. Perpendicular lines are drawn from the point $Q_m$ toward all line segments that constitute the command path. In doing this, a consideration is given to only that or those perpendicular lines which intersect the line segments. If there are a plurality of perpendicular lines that meet this condition, as shown in FIG. 9, the shortest of them is selected. The shortest of the line segments connecting the actual position $Q_m$ and all points that constitute the command path is compared with the shortest of the previously selected perpendicular lines. The shorter of these compared lines is regarded as an error vector, and its length is regarded as an error. FIG. 10 is a diagram illustrating a case where the error vector cannot be determined by such procedure. In this case, distances from the point $Q_m$ to the command positions $P_n$ are calculated, and the smallest of the calculated values is regarded as an error.

Figure 11:
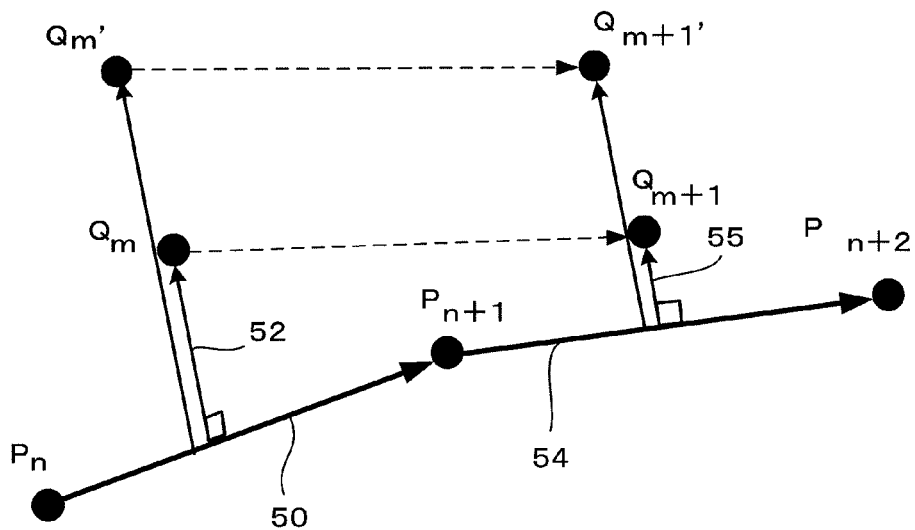
FIG. 11 is a diagram illustrating enlarged display of errors.

In general, the amount of error between an actual position path and a command path is considerably smaller than the distance between points that constitute the command path. Therefore, it is advisable to facilitate visual recognition of the error. FIG. 11 is a diagram illustrating enlarged display of errors.

As shown in FIG. 11, perpendicular lines (error vectors) drawn from the actual position or point $Q_m$ to the line segments that constitute the command path are extended at a predetermined magnification ratio, whereby the point $Q_m$ is shifted to points $Q_{m'}$ at the respective extreme ends of the extended perpendicular lines. Then, a path that connects the points $Q_{m'}$ is displayed as the path of an actual position reached after error magnification. Thus, according to Embodiment 3, actual positions with large errors can be made easily visually recognizable.

In the example of FIG. 11, the actual position $Q_{m'}$ reached after the error magnification is determined by extending a perpendicular line indicative of an error of the actual position $Q_m$ to, for example, twice its original length, and moreover, an actual position $Q_{m+1'}$ reached after the error magnification is determined by extending a perpendicular line indicative of an error of an actual position $Q_{m+1}$ to, for example, twice its original length. In this way, if an actual position path based on, for example, the actual positions $Q_m$ and $Q_{m+1}$ are separated from the command path to the degree shown in (a) of FIG. 12, the error is exaggerated compared with reality in the case of an actual position path based on the actual positions $Q_{m'}$ and $Q_{m+1'}$ reached after the error magnification, as shown in (b) of FIG. 12.

Figure 12:
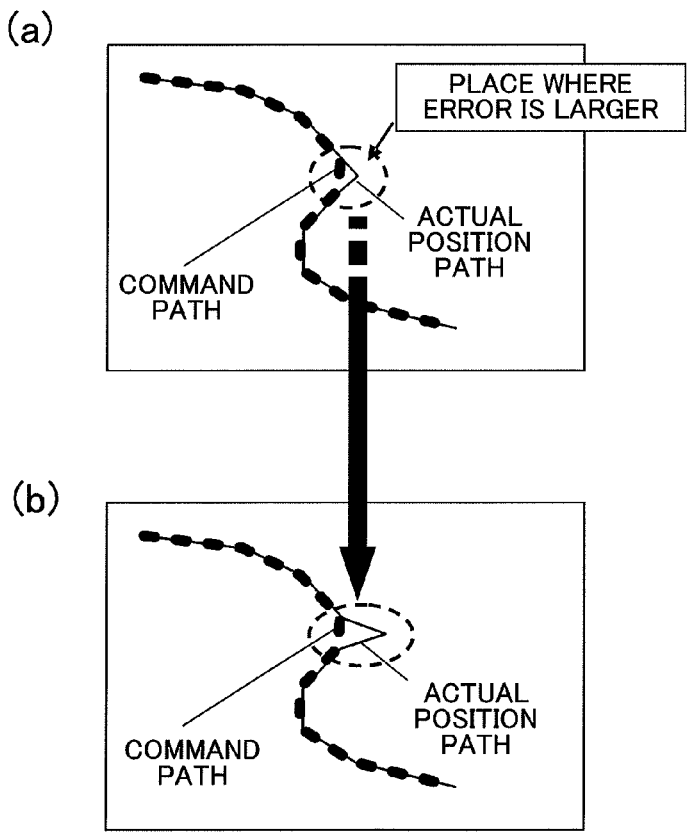
FIG. 12 is a diagram illustrating enlarged display of an error of the actual position path with respect to the command path.

FIG. 12 is a diagram illustrating enlarged display of the error of the actual position path compared with the command path. Thus, an operator can more easily find out actual positions with large errors. In the case where no perpendicular lines can be drawn from the actual position $Q_m$ to the line segments that constitute the command path, as shown in FIG. 10, it is advisable to magnify the error to the actual position side at a predetermined magnification ratio in like manner. In this way, the position and direction in which the error is caused can be made easily visually recognizable by stereoscopically displaying the command path in combination with the actual position path with the magnified error.

Figure 13A:
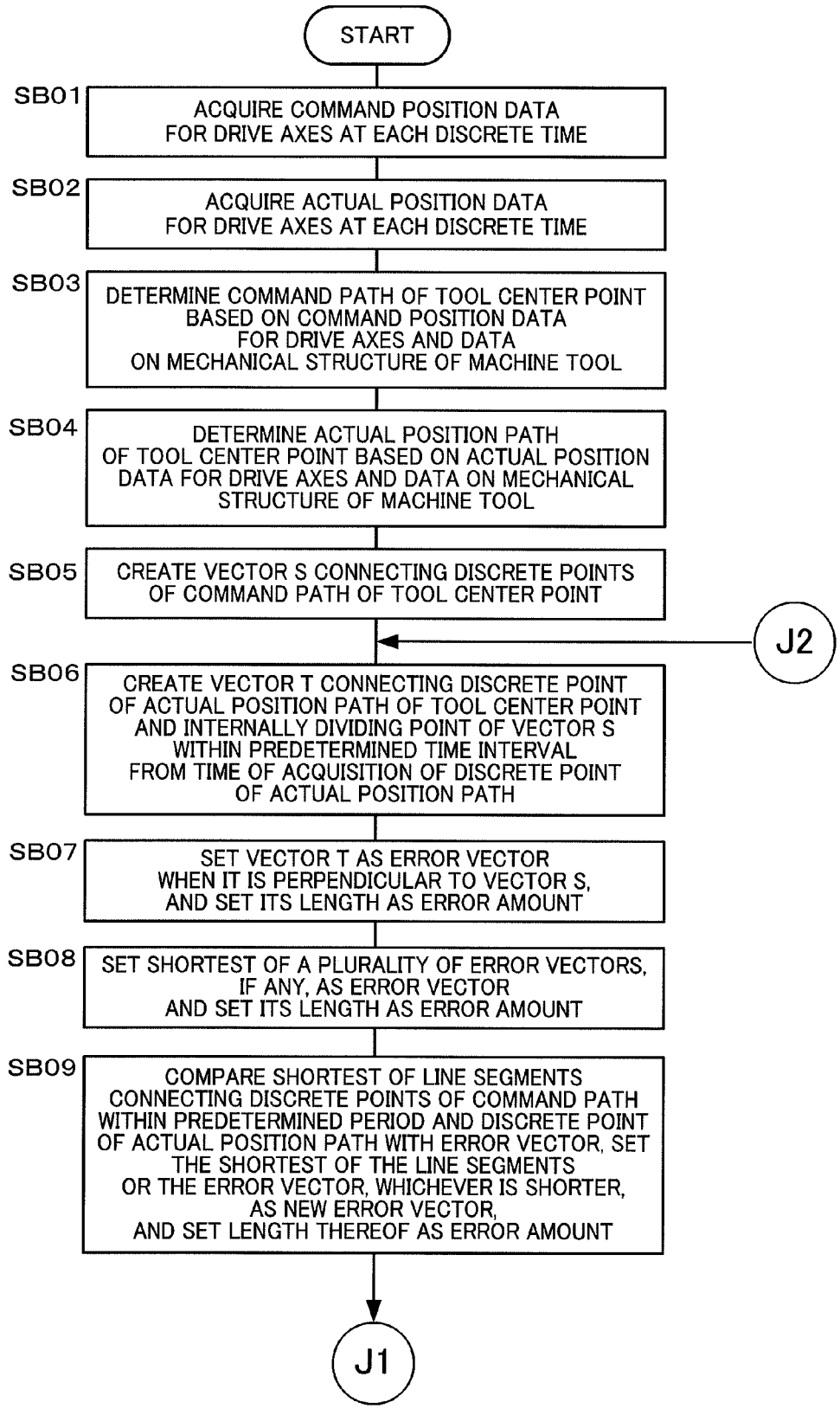
FIGS. 13A and 13B are flowcharts showing an example of processing for determining an error of the actual position of the tool center point.
Figure 13B:
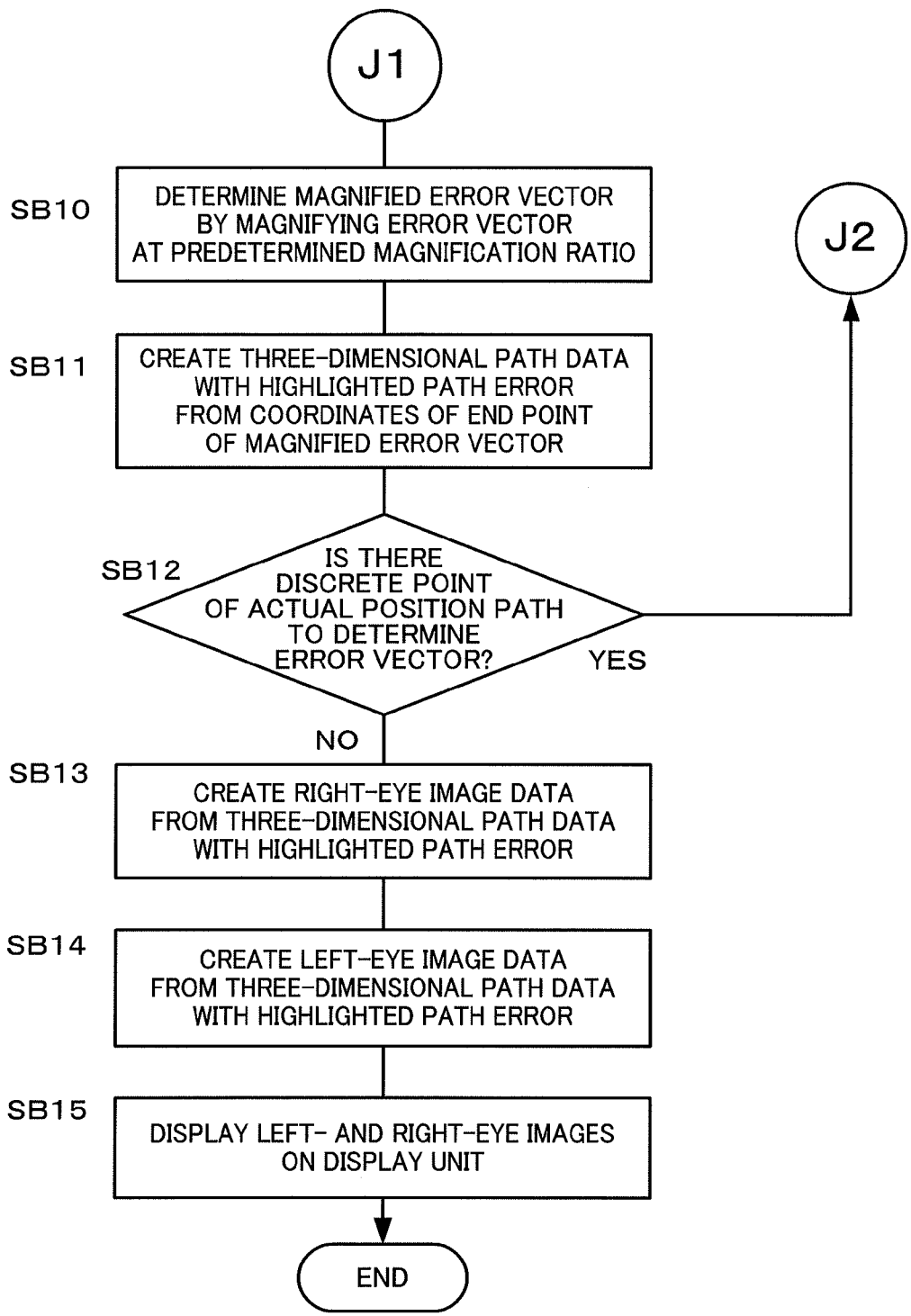

FIGS. 13A and 13B are flowcharts showing an example of processing for determining the error of the actual position of the tool center point. The following is a sequential description of processing to be carried out at respective steps.

[Step SB01] Command position data for the individual drive axes at each discrete time are simultaneously acquired.

[Step SB02] Actual position data for the individual drive axes at each discrete time are acquired.

[Step SB03] The command path of the tool center point is determined based on the command position data for the individual drive axes and data on the mechanical structure of the machine tool.

[Step SB04] The actual position path of the tool center point is determined based on the actual position data for the individual drive axes and data on the mechanical structure of the machine tool.

[Step SB05] A vector S that connects discrete points of the command path of the tool center point is created.

[Step SB06] A vector T that connects a discrete point of the actual position path of the tool center point and an internally dividing point of the vector S within a predetermined time interval from the time of acquisition of the discrete point of the actual position path is created. The start point of the vector T is located on the discrete point of the command path or a line segment that forms the vector S.

[Step SB07] The vector T is regarded as an error vector if it is perpendicular to the vector S, and its length is regarded as an error amount.

[Step SB08] If there are a plurality of error vectors within a predetermined time interval, the shortest of them is regarded as an error vector, and its length is regarded as an error amount.

[Step SB09] The shortest of line segments that connect the discrete points of the command path within a predetermined time interval and the discrete point of the actual position path is compared with the error vector, and the shortest of the line segments or the error vector, whichever is shorter, is regarded as a new error vector, and its length is regarded as an error amount.

[Step SB10] A magnified error vector is determined by magnifying the error vector at a predetermined magnification ratio.

[Step SB11] Three-dimensional path data with a highlighted path error is created based on the coordinates of the end point of the magnified error vector.

[Step SB12] It is determined whether or not there is a discrete point of the actual position path to determine the error vector. If there is one, the program returns to Step SB06, whereupon the processing is continued.

[Step SB13] The right-eye image data is created based on the three-dimensional path data with the highlighted path error.

[Step SB14] The left-eye image data is created based on the three-dimensional path data with the highlighted path error.

[Step SB15] Left- and right-eye images are displayed on the display unit, whereupon the processing ends.

In some cases, the workpiece to be machined may be cut by means of a side surface of a tool 3. FIG. 14 is a diagram illustrating a tool vector.

In the case of machining using a tool side surface, the inclination of the tool influences the cut surface. In machining the workpiece by the side surface of the tool 3, as shown in (a) of FIG. 14, the cut surface is affected if the tool 3 is inclined. In (b) of FIG. 14, the inclination of the tool is represented as tool vectors, which are displayed along the path of the tool center point, and it is indicated that the cut surface of the workpiece is influenced by the inclination of a tool vector. Thus, the state of the cut surface can be evaluated and analyzed by displaying, on a display device, a tool vector that starts from a point at a predetermined distance from its end point at the tool center point toward the base of the tool.

The tool center point Pe, which is the end point of the tool vector, is determined according to the foregoing equation (1). A point on the central axis of the tool at a distance d from the tool center point Pe toward the point M is assumed to be a tool vector start point Ps. Coordinates (PosX'(t), PosY'(t), PosZ'(t)) of the tool vector start point Ps are calculated according to $$PosX'=x(t)+(L-d) \times \cos(a(t)) \times \sin(b(t)),$$

$$PosY'=y(t)+(L-d) \times \sin(a(t)), \text{ and}$$

$$PosZ'=z(t)-(L-d) \times \cos(a(t)) \times \cos(b(t)). \quad (3)$$

A length L of the tool, which corresponds to the distance from the point M to the tool center point Pe, is stored as a tool length in the numerical controller of the machine tool. Thus, the coordinates of the tool center point Pe and the tool vector start point Ps can be calculated based on position data for five axes and conditions of the mechanical structure of the machine tool.

Figure 15:
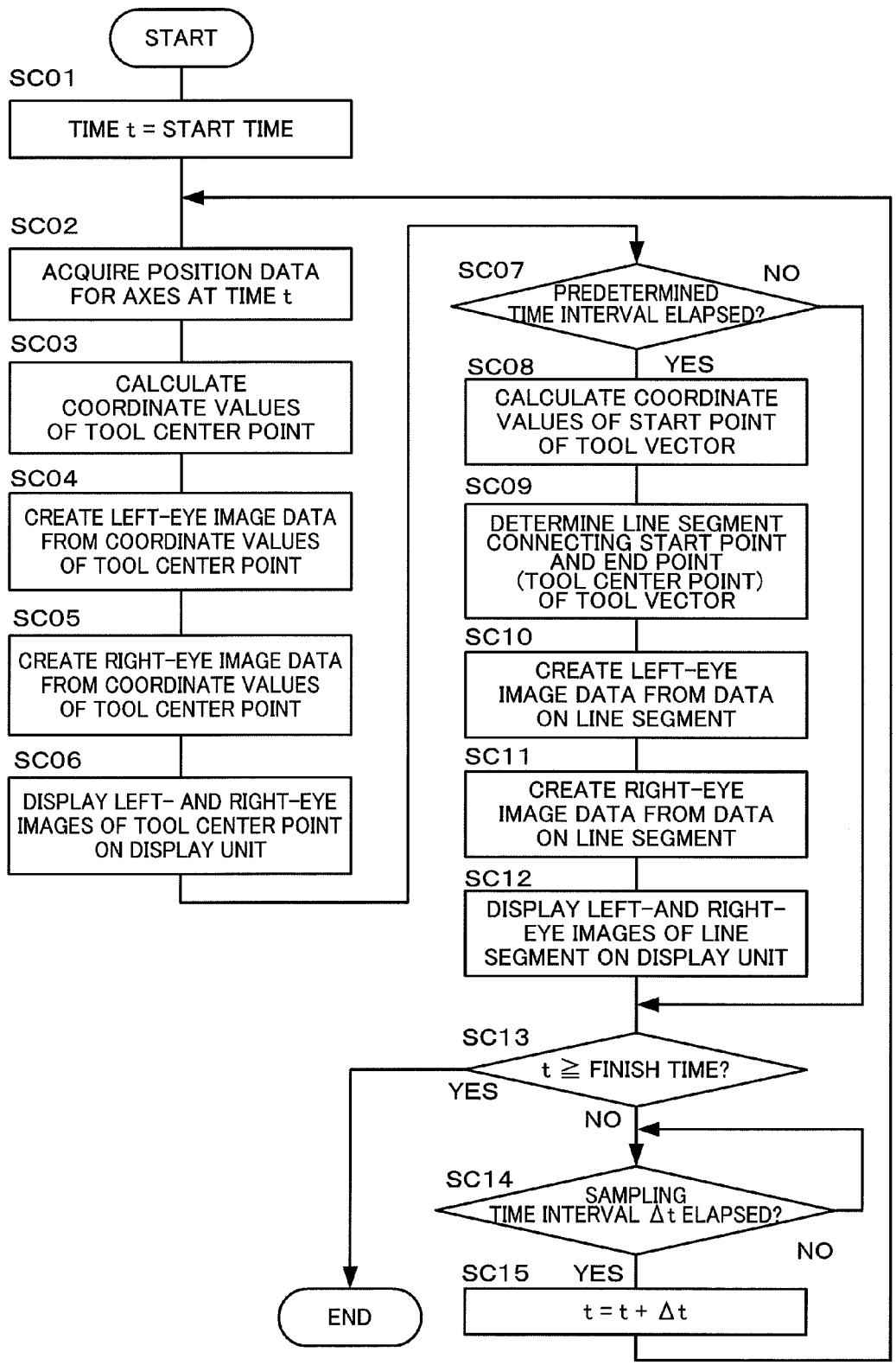
FIG. 15 is a flowchart showing an example of processing for stereoscopically displaying the tool vector.

FIG. 15 is a flowchart showing an example of processing for stereoscopically displaying the tool vector. The following is a sequential description of various steps of operation.

[Step SC01] A start time is input to TIME t.

[Step SC02] Position data for the individual axes at TIME t are acquired.

[Step SC03] The coordinate values of the tool center point are calculated.

[Step SC04] The left-eye image data is created based on the coordinate values of the tool center point.

[Step SC05] The right-eye image data is created based on the coordinate values of the tool center point.

[Step SC06] Left- and right-eye images of the tool center point are displayed on the display unit, based on the left- and right-eye image data.

[Step SC07] It is determined whether or not a predetermined time interval has elapsed. If it is determined that the predetermined time interval has not elapsed, the program proceeds to Step SC13. If the predetermined time interval is determined to have elapsed, the program proceeds to Step SC08.

[Step SC08] The coordinate values of the start point of the tool vector are calculated.

[Step SC09] A line segment that connects the start point of the tool vector and the tool center point (the end point of the tool vector) is determined.

[Step SC10] The left-eye image data is created based on data on the line segment determined in Step SC09.

[Step SC11] The right-eye image data is created based on the data on the line segment determined in Step SC09.

[Step SC12] Left- and right-eye images of the line segment are displayed on the display unit, based on the left- and right-eye image data.

[Step SC13] It is determined whether or not the TIME t has passed a finish time. If it is determined that the finish time is not passed, the program proceeds to Step SC14. If the finish time is determined to have been passed, this processing is terminated.

[Step SC14] It continues to be determined whether or not a sampling time interval Δt has elapsed. If the time interval Δt is determined to have elapsed, the program proceeds to Step SC15.

[Step SC15] TIME t is updated by adding the sampling time interval Δt to the current TIME t, whereupon the program returns to Step SC02 and this processing is continued.

In a tool vector display apparatus for a machine tool configured to control the positions and attitudes of a tool and a workpiece by means of a plurality of drive axes including at least one rotary axis and perform machining, according to the present invention, the orientation of the tool relative to the workpiece at each point on a tool center point path can be visually intelligibly displayed, based on actual feedback data. An influence on the cut surface can be made easily visually recognizable by stereoscopically displaying the workpiece on the display screen of the tool path display apparatus and also stereoscopically displaying the tool vector.

It is difficult, however, to visually grasp the direction of movement of a movable part such as a tool center point by only stereoscopically displaying the path of the movable part on the display screen of the tool path display apparatus. Therefore, visual recognition of the movement direction is facilitated by displaying a marker, as well as the path, on the display screen. FIG. 16 is a diagram illustrating the marker display.

The visual grasp of the commanded movement direction of a tool center point can be facilitated by moving the marker along time-series data on the tool center point on the actual position path of the tool center point or the three-dimensional path generated based on the left- and right-eye stereoscopic images calculated from the actual position path.

Figure 17:
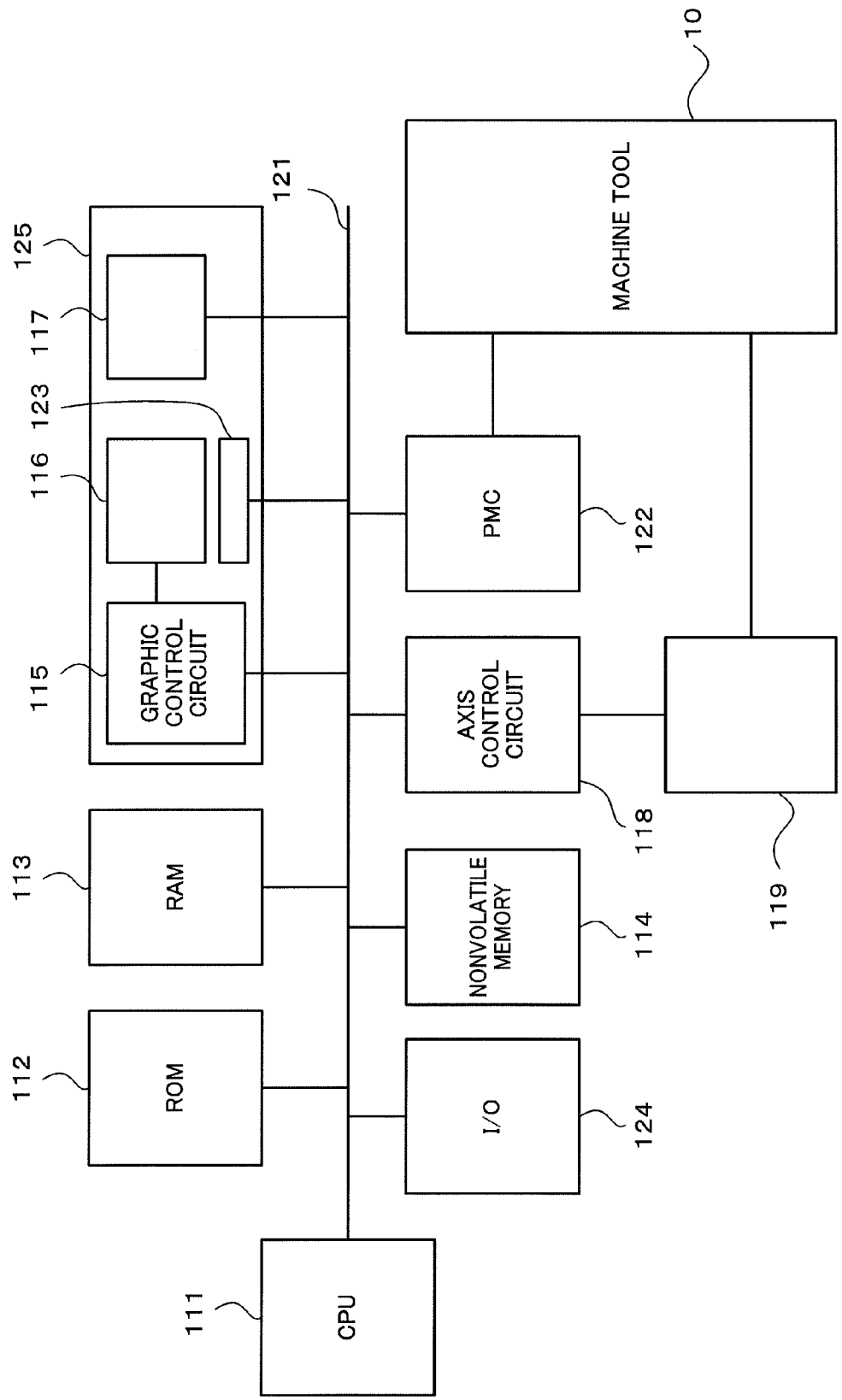
FIG. 17 is a block diagram schematically showing a configuration of one embodiment of a tool path display apparatus for a machine tool according to the present invention.

FIG. 17 is a block diagram schematically showing a configuration of one embodiment of a tool path display apparatus for a machine tool according to the present invention.

A CPU 111 for use as a processor controls the entire numerical controller 20 according to a system program stored in a ROM 112. Various data or input/output signals are stored in a RAM 113. Various data stored in a nonvolatile memory 114 are retained even after the power supply is cut off.

A graphic control circuit 115 converts digital signals to display signals, which are delivered to a display apparatus 116. A keyboard 117 is a means including numeric keys, character keys, etc., configured to input various set data.

An axis control circuit 118 receives move commands for the individual axes from the CPU 111 and outputs axis commands to a servo amplifier 119. On receiving the axis commands, the servo amplifier 119 drives a servomotor (not shown) of the machine tool 10. These constituent elements are connected to one another by a bus 121.

A programmable machine controller (PMC) 122 receives a T-function signal (tool selection signal) and the like through the bus 121 during the execution of a machining program. The PMC 122 processes this signal according to a sequential program and outputs the processed signal as an operation command, thereby controlling the machine tool 10. On receiving a state signal from the machine tool 10, moreover, the PMC 122 transfers a necessary input signal to the CPU 111.

Further, the bus 121 is connected with a software key 123 and an interface 124. The function of the software key 123 varies according to the system program or the like. NC data is delivered via the interface 124 to an external device such as a storage device. The software key 123, along with the display apparatus 116 and the keyboard 117, is disposed on a display/MDI panel 125.

What is claimed is:

1. A tool path display apparatus for a machine tool, the tool path display apparatus configured to display a three-dimensional path of a movable part of the machine tool, the machine tool configured to control positions and attitudes of a tool and a workpiece by means of a plurality of drive axes using a numerical controller, the tool path display apparatus comprising:
    a data acquisition unit configured to simultaneously acquire and store, as time-series data, actual position data for the plurality of drive axes at each time;
    a movable part path calculation unit configured to determine the three-dimensional path of the movable part by calculating three-dimensional coordinate values of the movable part as viewed from a coordinate system secured to the workpiece, based on the actual position data stored in the data acquisition unit and data on a mechanical structure of the machine tool;
    a stereoscopic image generation unit configured to determine left- and right-eye stereoscopic image data based on the three-dimensional path of the movable part determined by the movable part path calculation unit;
    a stereoscopic image display unit configured to display the left- and right-eye stereoscopic image data determined by the stereoscopic image generation unit so that the image data are visible from the left and right eyes corresponding thereto, wherein a point corresponding to a certain time is displayed highlighted on the stereoscopic image data generated by the stereoscopic image generation unit, the highlighted point being displayed moving on a path as the tool moves with time;
    a command position data acquisition unit configured to simultaneously acquire, as time-series data, command position data for the plurality of drive axes at each time;
    a movable part command path calculation unit configured to determine a command path of the movable part by calculating command coordinate values of the movable part as viewed from the coordinate system secured to the workpiece, based on the command position data for the plurality of drive axes at each time and the data on the mechanical structure of the machine tool;
    a path error calculation unit configured to determine an error between the command path and the three-dimensional path of the movable part;
    an error-magnified three-dimensional path generation unit configured to generate three-dimensional path data with the error highlighted by magnifying the error determined by the path error calculation unit at a predetermined magnification ratio relative to the command path; and
    a stereoscopic image generation unit configured to determine left- and right-eye stereoscopic image data based on the three-dimensional path data with the highlighted error determined by the error-magnified three-dimensional path generation unit.

2. The tool path display apparatus according to claim 1, wherein
    the plurality of drive axes include at least one rotary axis, and
    the movable part is a tool center point of the tool.

3. In combination, a machine tool and a tool path display apparatus, wherein
    the machine tool comprises a tool configured to machine a workpiece and a plurality of drive axes, the machine tool configured to control positions and attitudes of the tool and the workpiece by means of the plurality of drive axes using a numerical controller, and
    the tool path display apparatus is configured to display a three-dimensional path of a movable part of the machine tool, and comprises:
    a data acquisition unit configured to simultaneously acquire and store, as time-series data, actual position data for the plurality of drive axes at each time;
    a movable part path calculation unit configured to determine the three-dimensional path of the movable part by calculating three-dimensional coordinate values of the movable part as viewed from a coordinate system secured to the workpiece, based on the actual position data stored in the data acquisition unit and data on a mechanical structure of the machine tool;
    a stereoscopic image generation unit configured to determine left- and right-eye stereoscopic image data based on the three-dimensional path of the movable part determined by the movable part path calculation unit;
    a stereoscopic image display unit configured to display the left- and right-eye stereoscopic image data determined by the stereoscopic image generation unit so that the image data are visible from the left and right eyes corresponding thereto, wherein a point corresponding to a certain time is displayed highlighted on the stereoscopic image data generated by the stereoscopic image generation unit, the highlighted point being displayed moving on a path as the tool moves with time;
    a command position data acquisition unit configured to simultaneously acquire, as time-series data, command position data for the plurality of drive axes at each time;
    a movable part command path calculation unit configured to determine a command path of the movable part by calculating command coordinate values of the movable part as viewed from the coordinate system secured to the workpiece, based on the command position data for the plurality of drive axes at each time and the data on the mechanical structure of the machine tool;
    a path error calculation unit configured to determine an error between the command path and the three-dimensional path of the movable part;
    an error-magnified three-dimensional path generation unit configured to generate three-dimensional path data with the error highlighted by magnifying the error determined by the path error calculation unit at a predetermined magnification ratio relative to the command path; and
    a stereoscopic image generation unit configured to determine left- and right-eye stereoscopic image data based on the three-dimensional path data with the highlighted error determined by the error-magnified three-dimensional path generation unit.

4. The tool path display apparatus according to claim 1, wherein the path error calculation unit is configured to
    create a first vector connecting first discrete points of the command path, create a second vector connecting second discrete points of the three-dimensional path of the movable part, the second discrete points corresponding to the first discrete points, and determine the second vector as an error vector when the second vector is perpendicular to the first vector, and set a length of said second vector as an error amount of the error between the command path and the three-dimensional path of the movable part.

5. The tool path display apparatus according to claim 4, wherein the path error calculation unit is configured to, when a plurality of the error vectors are determined within a predetermined time interval, determine an error vector among the plurality of error vectors and having a shortest length as a new error vector, and set the shortest length of said error vector as a new error amount of the error between the command path and the three-dimensional path of the movable part.

6. The combination according to claim 3, wherein the path error calculation unit is configured to create a first vector connecting first discrete points of the command path, create a second vector connecting second discrete points of the three-dimensional path of the movable part, the second discrete points corresponding to the first discrete points, and determine the second vector as an error vector when the second vector is perpendicular to the first vector, and set a length of said second vector as an error amount of the error between the command path and the three-dimensional path of the movable part.

7. The combination according to claim 6, wherein the path error calculation unit is configured to, when a plurality of the error vectors are determined within a predetermined time interval, determine an error vector among the plurality of error vectors and having a shortest length as a new error vector, and set the shortest length of said error vector as a new error amount of the error between the command path and the three-dimensional path of the movable part.

* * * * *